United States Patent [19]
Anderson

[11] Patent Number: 4,889,188
[45] Date of Patent: Dec. 26, 1989

[54] HORSESHOE

[76] Inventor: Willard H. Anderson, 849 Beryl St., San Diego, Calif. 92109

[21] Appl. No.: 207,209

[22] Filed: Jun. 16, 1988

[51] Int. Cl.$^4$ ............................ A01L 5/00; A01L 7/02
[52] U.S. Cl. ..................................................... 168/13
[58] Field of Search ................................ 168/4, 12, 13

[56] References Cited

U.S. PATENT DOCUMENTS

| | | | |
|---|---|---|---|
| 737,845 | 9/1903 | Jackson | 168/13 |
| 2,094,743 | 10/1937 | Kearney | 168/13 |
| 2,096,504 | 10/1937 | Anderson | 168/13 |
| 3,090,718 | 5/1963 | Dixon | 168/13 X |

FOREIGN PATENT DOCUMENTS

| | | | |
|---|---|---|---|
| 2427119 | 2/1976 | Fed. Rep. of Germany | 168/DIG. 1 |
| 225461 | 12/1924 | United Kingdom | 168/12 |

Primary Examiner—Robert P. Swiatek
Attorney, Agent, or Firm—Charles C. Logan, II

[57] ABSTRACT

A horseshoe formed of a predetermined metallic material having a central arcuate portion, an arcuate right leg portion, and an arcuate left leg portion. The arcuate leg portions have a predetermined thickness of non-metallic shock absorbing material attached to their bottom surface. The shock absorbing material has a plurality of recessed portions in its bottom surface and nail hole apertures are located therein that pass through the shock absorbing material and also the metallic material of the horseshoe. The non-metallic shock absorbing material absorbs up to 70 percent of the shock received by the horse's foot while walking or running. One embodiment of the horseshoe has ceramic chips embedded in the bottom surface of the arcuate leg portions to help prevent slipping on ice or wet pavement.

10 Claims, 1 Drawing Sheet

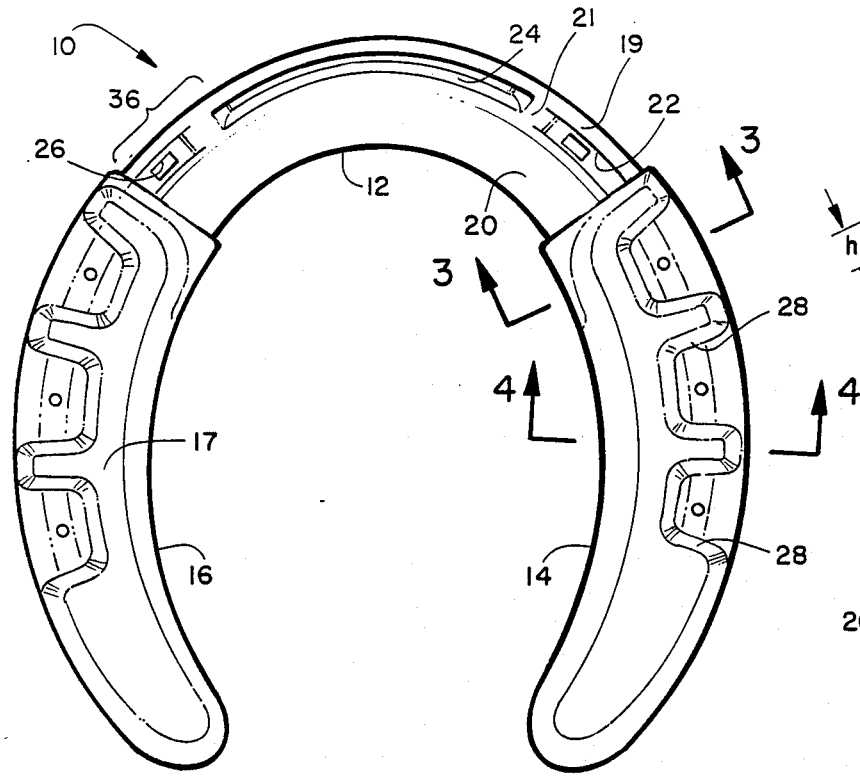
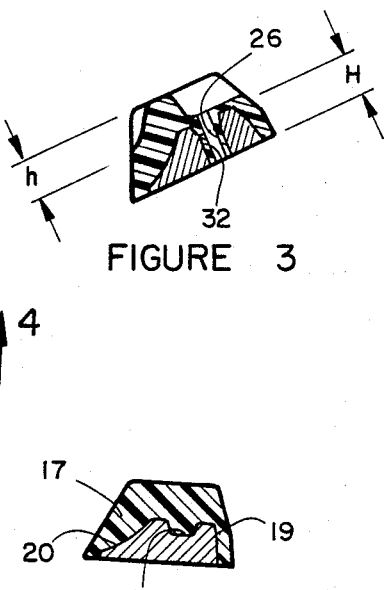
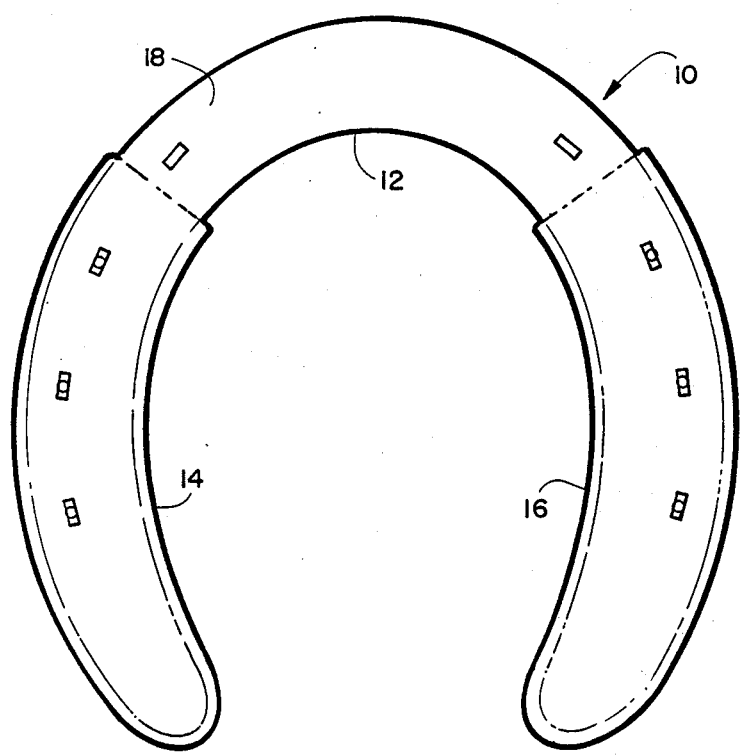
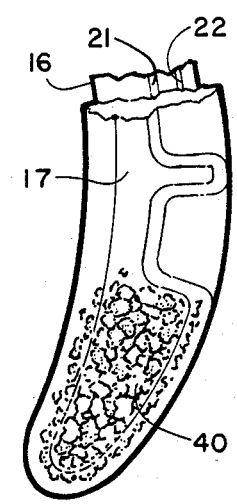
FIGURE 1
FIGURE 2
FIGURE 3
FIGURE 4
FIGURE 5

1

HORSESHOE

BACKGROUND OF THE INVENTION

The invention relates to horseshoes and more specifically to a horseshoe designed to reduce the amount of shock received by the hoof of a horse while walking or running.

Presently, state of the art horseshoes are made of a metallic material which is attached to the bottom surface of the horse's hoof by a plurality of nails. Since a horse normally weighs upwardly of one thousand pounds or more, each step while walking or running produces a tremendous impact force on the bottom surface of the horse's hoof. The metallic horseshoes presently used do nothing to lessen the amount of the force.

It is an object of the invention to provide a novel horseshoe having non-metallic shock absorbing material attached to its bottom surface.

It is another object of the invention to provide a novel horseshoe that will aid in relieving pain in the foot, ankle, knee and shoulders of injured horses.

It is also an object of the invention to provide a novel horseshoe that will allow injured horses to recover at an accelerated rate from injuries to their feet, ankles, knees and shoulders.

It is also an object of the invention to provide a novel horseshoe having ceramic chips embedded in the bottom surface of its arcuate leg portions to prevent slipping on ice or wet pavement.

It is a further object of the invention to provide a novel horseshoe that increases the useful life of the horse shoe due to the abrasive resistant properties of the non-metallic shock absorbing material attached to its bottom surface.

It is an additional object of the invention to provide a novel horseshoe that is economical to manufacture and market.

SUMMARY OF THE INVENTION

Applicant's novel horseshoe is formed from a standard metal horseshoe having a central arcuate portion, an arcuate right leg portion, and an arcuate left leg portion. the bottom surface of the horseshoe is covered with a predetermined thickness of non-metallic shock absorbing material. The shock absorbing material has a plurality of recessed portions where nail hole apertures are located that pass entirely through the shock absorbing material and the metal of the horseshoe.

The bottom surface of the arcuate leg portions each have an inner concave portion, an outer convex portion and a ridge portion therebetween. The nail hole apertures pass upwardly through the ridge portion and the non-metallic shock absorbing material forms a plug in the nail hole apertures that aids in securing the shock absorbing material to the horseshoe. The non-metallic shock absorbing material also covers the inner concave portion and the outer convex portion of the metallic horseshoe to further aid in securing the shock absorbing material to the horseshoe.

The non-metallic shock absorbing material attached to the bottom surface of the arcuate leg portions provide structure for stabilizing the horse's foot against lateral side motion while running. Also, on the horseshoes to be mounted on the front hoof of the horse, an arcuate toe member extends downwardly from the bottom surface of the metal horseshoe. A dirt relief gap is provided between the lateral edges of the arcuate toe member and the buildup of non-metallic shock absorbing material which allows the dirt which is initially captured behind the toe member to slide outwardly through the dirt relief gap and not become clogged behind the toe member on the bottom of the horse's hoof.

The non-metallic shock absorbing material is Hiperthane. It is a MDI based polyether which cures to a resilient bouncy high tear elastomer in the 90 Shore A range. The resin is ideal when a high performance elastomer with good abrasion resistance is required. Some of its physical properties are set forth below:

| | |
|---|---|
| Hardness, Shore A (00/10 sec.) | 90/89 |
| Tensile Strength, psi | 6700 |
| Ultimate Elongation, % | 550 |
| Modulus, psi | |
| 100% Elongation | 1100 |
| 300% Elongation | 2030 |
| Tear Resistance, Die C, pli | 750 |
| Split Tear, pli | 380 |
| Compression Set, %, Meth, B | 30 |
| Abrasion-3000 gm., 1000 cy. | 29 |
| Taber H18 Wheels, mg. loss | |
| Bashore Resilience, % | |

DESCRIPTION OF THE DRAWINGS

FIG. 1 is a bottom plan view of the novel horseshoe;

FIG. 2 is a top plan view of the the novel horseshoe;

FIG. 3 is a cross-sectional view taken along lines 3—3 of FIG. 1;

FIG. 4 is a cross-sectional view taken along lines 4—4 of FIG. 1; and

FIG. 5 is a partial bottom plan view of an alternative embodiment horseshoe having ceramic chips embedded in its bottom surface.

DESCRIPTION OF THE PREFERRED EMBODIMENT

Applicant's novel horseshoe will now be described by referring to FIGS. 1–5 of the drawing. The horseshoe is generally designated numeral 10. It has a central arcuate portion 12, an arcuate left leg portion 14, and an arcuate right leg portion 16. The metallic portion of the horseshoe has a top surface 18. The bottom surface of the horseshoe has a convex outer portion 19, a concave inner portion 20, and a top ridge portion 21. A groove 22 extends along a major portion of the ridge portion 21 of the arcuate right and leg portions. A predetermined thickness (h) of non-metallic shock absorbing material is attached to the bottom surface. The metallic portion of the shoe has a height (H).

An arcuate toe member 24 extends downwardly from the bottom surface of the horseshoe that is worn on the front hoofs of a horse.

A plurality of nail holes 26 pass through both the non-metallic shock absorbing material 17 and the metal horseshoe. Recessed portions 28 are formed in the shock absorbing material 17 surrounding the nail hole apertures 26. The portion of the shock absorbing material that has flowed into the groove 22 and the nail apertures 26 forms the respective plugs 30 and 32 and these aid in attaching the shock absorbing material to the bottom surface of the metallic horseshoe.

A dirt relief gap 36 is formed between the lateral edges of arcuate toe member 24 and the build up shock absorbing material 17 on the arcuate right and left leg portions 14 and 16.

An alternative embodiment is illustrated in FIG. 5 and it shows the use of ceramic chips 40 embedded in the bottom surface of the non-metallic shock absorbing material 17 that is attached to the arcuate leg portions of a horseshoe.

What is claimed is:

1. A horseshoe formed of a predetermined metallic material comprising:
    a central arcuate portion, an arcuate right leg portion, and an arcuate left leg portion;
    said horseshoe having a flat top surface that attaches to the bottom surface of a horse's hoof and a bottom surface for walking on;
    said bottom surface of said arcuate leg portions having an inner concave portion, an outer convex portion and a ridge portion therebetween, a groove extends along a major portion of the ridge portion of said arcuate right and left leg portions;
    a plurality of nail hole apertures are formed in said arcuate right leg portion and in said arcuate left leg portion and said nail hole apertures have their bottom ends in communication with said groove; and
    a predetermined thickness of non-metallic shock absorbing material attached to the bottom surface of said horseshoe and a portion thereof has flowed into said groove to form plugs that aid in attaching said shock absorbing material to the bottom surface of said metallic horseshoe.

2. A horseshoe as recited in claim 1 further comprising recessed portions in said non-metallic shock absorbing material where said nail hole apertures are located.

3. A horseshoe as recited in claim 2 wherein said recessed portions are located along the outside edges of said leg portions.

4. A horseshoe as recited in claim 1 wherein said central arcuate portion has a downwardly extending arcuate toe member.

5. A horseshoe as recited in claim 4 wherein there is a dirt relief gap located on both lateral sides of said arcuate toe member.

6. A horseshoe as recited in claim 1 wherein said horseshoe is made of aluminum.

7. A horseshoe as recited in claim 1 wherein said horseshoe is made of steel.

8. A horseshoe as recited in claim 1 wherein the thickness of said horseshoe has a height (H) and the thickness (h) of said non-metallic shock absorbing material is at least 0.50 H.

9. A horseshoe as recited in claim 1 wherein said non-metallic shock absorbing material is Hiperthane.

10. A horseshoe as recited in claim 1 further comprising ceramic chips embedded in the bottom surface of said arcuate leg portions to help prevent slipping on ice or wet pavement.

* * * * *